US005739771A

United States Patent [19]
Fisher

[11] Patent Number: 5,739,771
[45] Date of Patent: Apr. 14, 1998

[54] AMBIGUOUS DIAL INDICATOR WITH SATURATING SETPOINTS

[75] Inventor: Paul A. Fisher, Scottsdale, Ariz.

[73] Assignee: Honeywell Inc., Minneapolis, Minn.

[21] Appl. No.: 573,821

[22] Filed: Dec. 18, 1995

[51] Int. Cl.$^6$ ............................................. G01C 21/00
[52] U.S. Cl. ..................... 340/978; 116/288; 340/971; 340/977
[58] Field of Search ..................... 340/980, 971, 340/973, 977, 978, 979, 461; 359/630; 345/7, 8; 116/47, 284, 288, 296

[56] References Cited

U.S. PATENT DOCUMENTS

| | | | |
|---|---|---|---|
| 3,033,035 | 5/1962 | Snodgrass | 340/978 |
| 3,317,906 | 5/1967 | Baldridge | 340/461 |
| 3,574,283 | 4/1971 | Albers | 340/980 |
| 3,936,797 | 2/1976 | Andresen, Jr. | 340/977 |
| 4,860,007 | 8/1989 | Konicke et al. | 340/977 |
| 5,272,463 | 12/1993 | Furuya et al. | 340/461 |

FOREIGN PATENT DOCUMENTS

| | | |
|---|---|---|
| 0324195 | 7/1989 | European Pat. Off. . |
| 2273260 | 12/1975 | France . |

*Primary Examiner*—Brent A. Swarthout
*Attorney, Agent, or Firm*—Brian C. Downs; Ronald E. Champion

[57] ABSTRACT

An ambiguous dial indicator intuitively communicates the relative value of setpoints to an operator. The ambiguous dial indicator includes an ambiguous scale and a pointer or needle. The setpoints are represented by "bugs" which are adjacent to the ambiguous scale. The bugs are limited to a predetermined range about the pointer such that when a setpoint is outside of the predetermined range the associated bug is limited to an edge of the range. When several setpoints are outside of the predetermined range the several associated bugs saturate or park at the edges of the range. The invention is particularly useful in head-up displays and helmet mounted displays.

16 Claims, 4 Drawing Sheets

AMBIGUOUS DIAL INDICATOR WITH SATURATING SETPOINTS

BACKGROUND OF INVENTION

The present invention relates generally to electronic displays and more specifically to ambiguous dial indicator symbology for displays.

In a vehicle it is important to convey information to the operator in an efficient manner. For aircraft, in particular, the communication of information to the pilot may be critical to the safety of the aircraft. Pilots of modern aircraft must be able to interpret and respond to displayed information quickly and accurately. Industry is continuously searching for techniques to improve the communication of information to the operator or pilot of a vehicle.

In response to this search many improvements have been made. Mechanical indicators have been used for years to communicate information such as speed, pressure, rate of change of a quantity, and the like. Digital readout displays, cathode ray tubes(CRTs), and flat panel displays improved communication over the mechanical indicators for many applications. More recently, head-up displays(HUD's) and helmet mounted displays(HMD's) have further enhanced the communication of data to the operator or pilot.

Head-up displays and helmet mounted displays are particularly useful since they permit a pilot to simultaneously look out the windshield while viewing certain indicators. A common feature of HUD's and HMD's are the "see through" type of symbology. See-through symbology is designed to communicate information to the pilot while minimizing interference of his view outside the aircraft. One type of see-through symbology used is an ambiguous dial indicator.

Ambiguous dial indicators are illustrated in FIG. 1. Ambiguous dial indicator 10 could indicate any quantity or rate but is described here as an airspeed indicator. Elements of indicator 10 include closed scale 10A and pointer 10B. Closed scale 10A is comprised of ten scale marks 11. Each scale mark 11 represents 10 kts. and each revolution represents 100 kts.

Ambiguous indicators are so named because there are two or more possible values associated with each configuration of the indicator. For example, suppose indicator 10 is an airspeed indicator as described above. Scale mark 11 in the 12 o'clock position represents 0 kts., 100 kts., 200 kts., etc. It is ambiguous regarding what airspeed is indicated by pointer 10B. Pointer 10B may be indicating 60 kts., 160 kts., 260 kts., etc.

The ambiguous dial is usually associated with an unambiguous digital readout. The ambiguous dial allows the operator to rapidly identify small deviations and rates of change of the indicated value as represented by pointer 10B. The digital readout provides the precise value but requires more time and effort to interpret.

One problem with ambiguous dial indicators is the display of "bugs". Bugs are markers which indicate significant values (in this case airspeeds). Bugs are typically positioned on or adjacent to scale 10A. The problem arises because there is no way to know whether a bug is on the same revolution as the pointer. For example, referring to FIG. 1, a bug positioned at the 12 o'clock position could indicate either 100 kts., 200 kts., or 300 kts. etc. Further, there is no way to know if a bug is at a higher or lower value than the pointer 10B. This presents ambiguous information to the pilot or operator and could represent a serious safety problem for a pilot who cannot determine whether a bug is above or below the current airspeed.

One obvious solution is to not display a bug until the pointer is within one half of a revolution of the bug. This is unsatisfactory for two reasons. First, it may not permit visual verification that the bug is set. Second, it gives the pilot no indication of the direction to the bug until the pointer is close to the bug.

Another type of indicator used with HUD's and the like are moving tape indicators such as illustrated in FIG. 2. Moving tape indicator 20 consists of scale 21, pointer 22, and bugs 23.

Scale 21 includes marks 21A and numbers 21B which indicate quantity of a standard unit. Scale 21 moves up or down such that pointer 22 indicates the correct value. Pointer 22 is fixed. Pointer 22 encloses a digital readout 22A which displays the absolute value of the quantity being displayed.

Bugs 23 indicate significant values (in this case airspeeds). Bugs 23 are parked at either the upper or lower edge of scale 21 when the values they represent are outside of the currently displayed tape. Bug 23A is shown parked at the upper limit. As moving scale 21 moves past a bug speed the bug becomes fixed to scale 21. Bug 23B is shown fixed to scale 21 at 130 kts.

Although moving tape indicators are not ambiguous and are able to display bugs they are undesirable for several reasons. Moving tapes use more display area than ambiguous dials, moving tapes obscure the view through a HUD or the like, moving tapes require more writing time due to their increased complexity, and on a HUD moving tapes tend to extend below the horizon which interferes with ground conformal symbology.

Vehicle displays would be simplified, operator error reduced, and safety improved by an ambiguous dial indicator which reduces the ambiguities associated with bugs.

Clearly there exists the need for an ambiguous dial indicator which permits bugs to be displayed in a less ambiguous fashion.

SUMMARY OF THE INVENTION

The invention discloses an ambiguous dial indicator which intuitively communicates the relative value of setpoints to the operator. The ambiguous dial indicator includes an ambiguous scale and a pointer or needle. The setpoints are represented by "bugs" which are adjacent to the ambiguous scale. The bugs are limited to a predetermined range about the pointer such that when a setpoint is outside of the predetermined range the associated bug is limited to an edge the range. When several setpoints are outside of the predetermined range the several associated bugs saturate or park at the edges of the range. The invention is particularly useful in head-up displays and helmet mounted displays.

The key to the invention is limiting bugs so that they are always within the predetermined range about the pointer. The range is defined to be a portion of the indicator which is within ± a delta of the pointer. Delta is chosen to be somewhat less than ½ revolution of the dial so the direction from the pointer to the bugs is intuitive.

In other words, the invention comprises an ambiguous dial indicator display system having a sensor means for measuring the absolute value of a quantity, a control system means for generating at least one setpoint signal representative of a setpoint value, and a symbol generator means, in communication with said sensor means and said control system means, for generating symbology signals representative of an ambiguous dial indicator having, 1) an ambiguous closed scale,
2) a pointer indicative of the absolute value, and,
3) at least one bug representative of one of the setpoint values, the bug characterized such that when the setpoint value is greater than the absolute value plus an offset then the bug is indicative of the absolute value plus the offset, when the setpoint value is less than the absolute value plus the offset and greater than the absolute value minus the offset then the bug is indicative of the setpoint value, and when the setpoint value is less than the absolute value minus the offset then the bug is indicative of the absolute value minus the offset.

Limiting the bugs allows an operator to quickly and intuitively determine several pieces of useful information. The operator can quickly identify which bugs are set, the relative position of a bug (i.e. whether a bug is above or below the pointer), and the magnitude of the difference between the bug and the indicated value when the indicated value (represented by the pointer) is near the bug.

The operator can determine which bugs are set since the invention permits bugs to be displayed at all times and not just when the bugs are on the same revolution as the pointer (as in the prior art). Bugs which are outside the predetermined range saturate or park at the edge of the range and thus allow the operator to view all the bugs which are set.

When closing on a setpoint, the bug is apparent since it is near the pointer, it is separate from the bugs at the edge of the range, and it is fixed to the scale as opposed to moving along the scale.

Similarly, an operator can quickly identify the relative position of a bug. The range is selected such that a bug parked at the lower edge of the range is closer to the pointer in the lower direction and thereby intuitively communicating to the operator that the bug is set below the pointer. Conversely, if a bug is parked at the upper edge of the range the bug is closer to the pointer in the upper direction thereby intuitively communicating that the bug is set above the pointer.

Finally, when the bug is fixed to the dial, the distance between the bug and the pointer represents the difference between the bug setpoint and the indicated value. The operator can utilize the dial to control the indicated value to the bug setpoint or tell when the indicated value passes the bug setpoint. In this manner the ambiguous dial is used the same as un-ambiguous dial indicators.

The invention is particularly useful with head-up displays and helmet mounted displays. It is known in the prior art that ambiguous dial indicators are useful with HUD's and HMD's because of their minimal interference with the operator's view through the display. The invention further enhances both the usefulness and safety of such ambiguous dial indicators by permitting bugs to be displayed without introducing dangerous ambiguities.

The invention solves the problems discussed above without unnecessary complexity. The operation of the bugs is intuitive and simple. The risk of communicating ambiguous information regarding bugs to the pilot is virtually eliminated.

Therefore, the objects of the invention are to provide an intuitive and non-ambiguous display of bugs on an ambiguous dial indicator and thereby improve aircraft safety.

A feature of the invention are bugs which saturate or park at the edges of a range about the pointer.

An advantage of the invention is the ability to communicate setpoints with less ambiguity.

Another advantage of the invention is the ability to communicate non-ambiguous setpoints in an intuitive manner.

The significant features of the invention are illustrated in the figures and described more fully below.

DETAILED DESCRIPTION

The preferred embodiment of the invention is an airspeed indicator for a head-up display. The following discussion describes the invention in terms of such an airspeed indicator. However, those skilled in the art understand that the invention is applicable to any ambiguous dial indicator in which setpoints are desired.

Figure 1A:
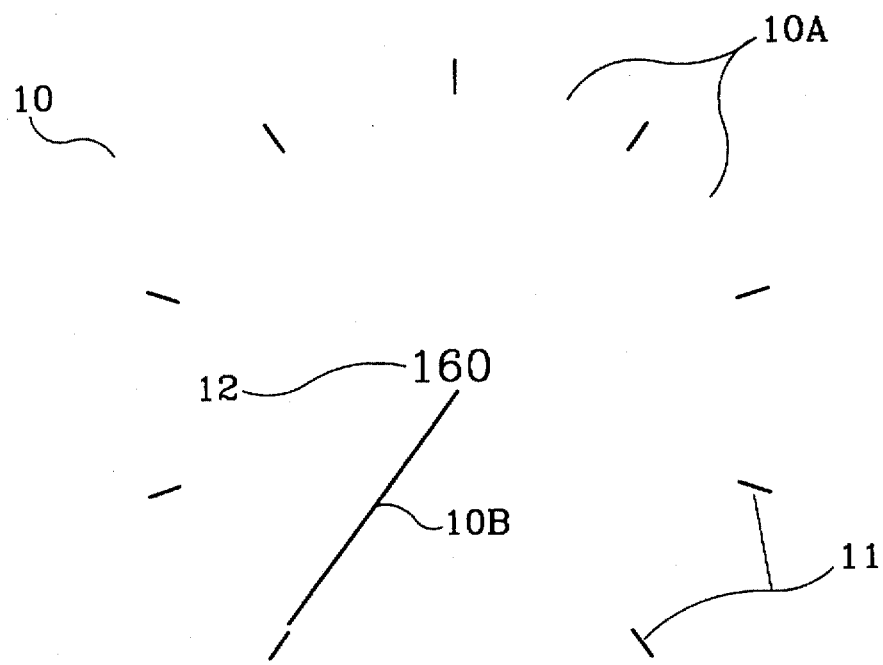
FIG. 1 illustrates prior art ambiguous dial indicators.
Figure 2:
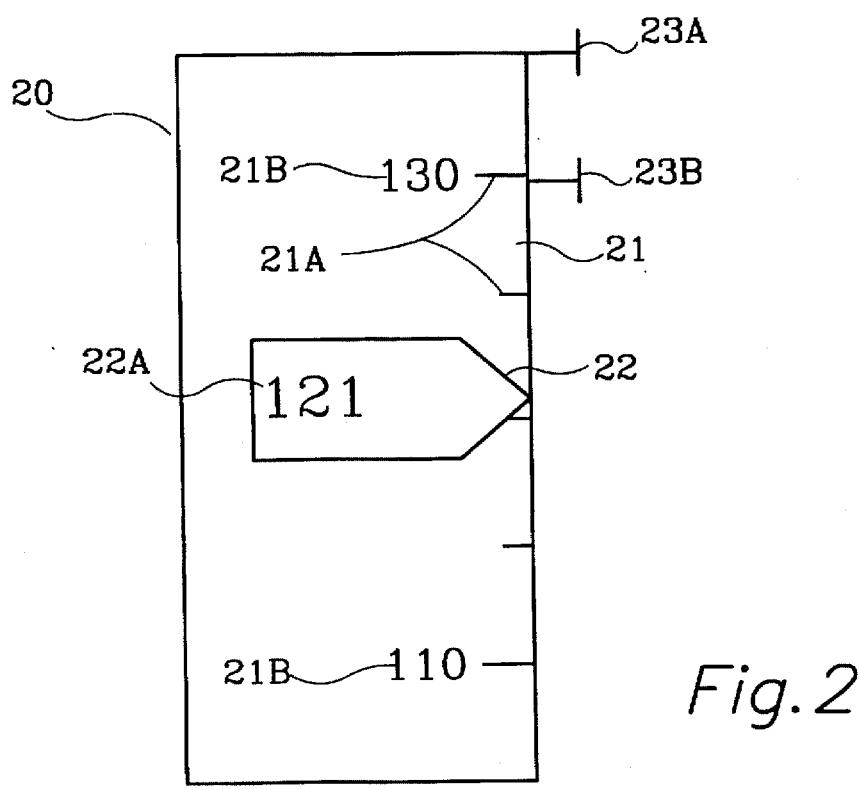
FIG. 2 illustrates a prior art airspeed tape indicator.
Figure 3A:
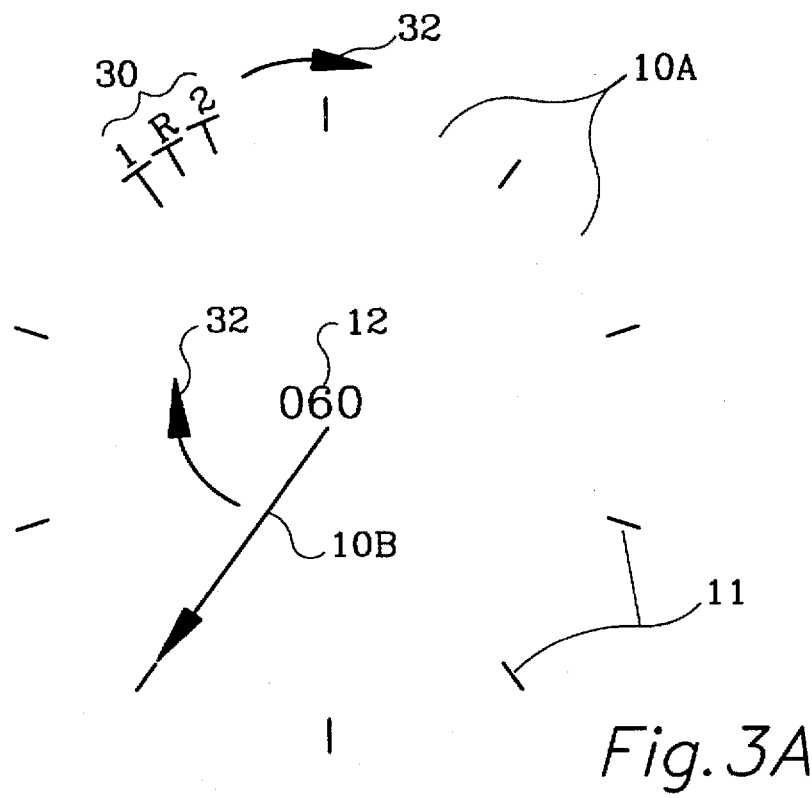
FIGS. 3A, 3B, and 3C illustrates the display of bugs on an ambiguous dial indicator according to the invention.
Figure 3B:
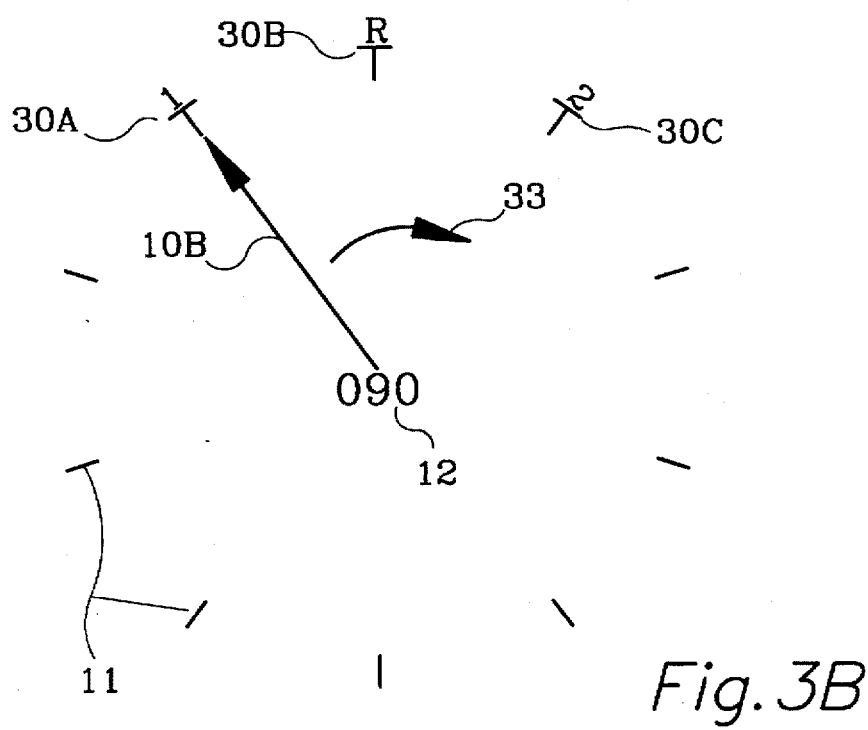
Figure 3C:
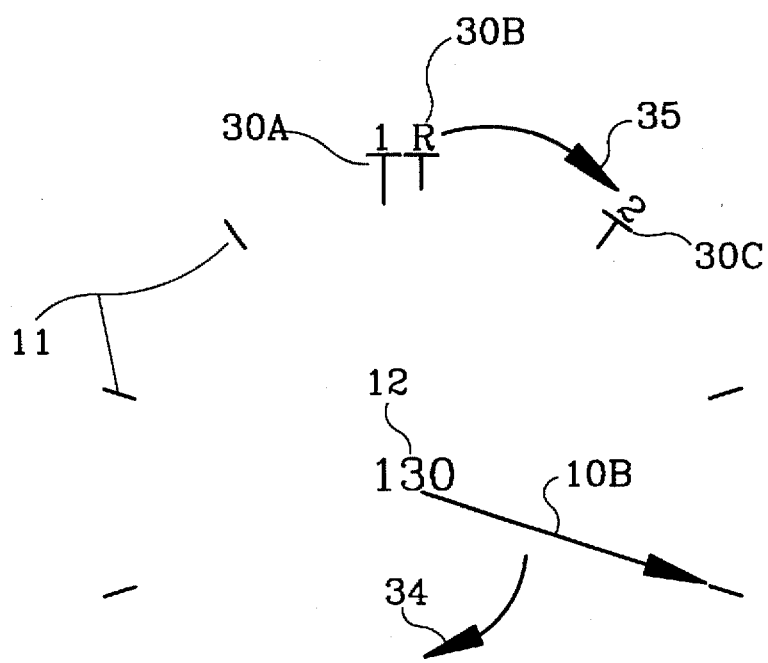

FIGS. 3A, 3B, and 3C illustrate the display of bugs according to the invention. Ambiguous scale 10A includes ten scale marks 11 which each represents 10 kts. Each revolution of indicator 10 therefore represents 100 kts. The scale mark 11 positioned at the 12 O'clock position represents 0 kts, 100 kts, 200 kts, 300 kts, etc. Clockwise rotation of pointer 10B indicates increasing speed and counter clockwise rotation indicates decreasing speed.

Scale 10A is a closed scale which means it is continuous and does not have ends. Ambiguous scale 10A is shown as circular, however, those skilled in the art recognize the invention may be used with any shape of closed scale such as oval, square, rectangular, or virtually any other desired shape.

Three bugs are displayed. V2 bug 30A indicates the takeoff safety speed, V1 bug 30B indicates the takeoff decision speed, and VR bug 30C indicates rotation speed. FIGS. 3A, 3B, and 3C illustrate the operation of the bugs 30 during the takeoff phase of flight.

The range to which bugs 30 are limited is defined as being the portion of scale 10A which is within ± 30 kts. of pointer 10B. The range is generically defined as being the portion of scale 10A which is within a predetermined offset or delta of pointer 10B. The offset or delta is selected to be less than ½ revolution such that the operator intuitively knows whether the bugs parked at the limits of the range are faster or slower than the indicated value.

Referring now to FIG. 3A, pointer 10B indicates 60 kts. and is moving clockwise as indicated by arrow 31. The upper limit or edge of the range is 90 kts. (i.e. 60 kts.+30 kts.) Three bugs 30 have been set and are displayed. Bugs 30 are saturated or parked at the edge of the range and are moving clockwise as indicated by arrow 32.

The indicator shown in FIG. 3A communicates several pieces of information to the pilot including the identity of each bug 30, the fact that bugs 30 are actually set, and that all bugs 30 are at least 30 kts. ahead of the current airspeed.

FIG. 3B shows bugs 30 as the airspeed increases. Pointer 10B now indicates 90 kts. and is moving clockwise as indicated by arrow 33. The upper limit or edge of the range is 120 kts. (i.e. 90 kts.+30 kts.) The lower limit is 60 kts. (i.e. 90 kts.−30 kts.) Each bug 30 is between the upper and lower limits.

All three bugs 30 are now fixed at their correct setpoints on scale 10A. Bugs 30 no longer move clockwise as in FIG.

3A. As the upper limit or edge of the range rotates clockwise pass a setpoint of a bug 30, the bug becomes fixed thus indicating its correct setpoint. V1 bug 30A is shown fixed at 90 kts., VR bug 30B is shown fixed to scale 10A at 100 kts., and V2 bug 30C is shown fixed at 110 kts.

The indicator of FIG. 3B communicates several pieces of information to the pilot. First, the pilot knows the aircraft has reached V1 speed. Because the pointer 10B is moving clockwise the pilot knows the airspeed is increasing. Since both VR bug 30B and V2 bug 30C are fixed the pilot can quickly see exactly how far it is to each bug. The pilot, in many cases, does not desire to know the exact airspeed. The pilot is more concerned with knowing that a reference or bug speed has been attained and that the airspeed continues to increase. Both of these vital pieces of information are readily available to the pilot from the indicator. In addition, if the pilot wishes to fly at the V2 speed he can do so by controlling the airspeed such that the pointer indicates the V2 bug.

FIG. 3C shows bugs 30 as pointer 10B exceeds all of the bugs 30. Pointer 10B indicates 130 kts. and is moving clockwise as indicated by arrow 34. The lower limit or edge of the range is now 100 kts. (130 kts.–30 kts.) Both V1 bug 30A and VR bug 30B are saturated or parked at the lower limit and are moving clockwise as indicated by arrow 35. V2 bug 30C is greater than the lower limit and therefore remains fixed to its correct setpoint of 110 kts.

The indicator of FIG. 3C communicates several pieces of information to the pilot. First, the pilot knows that the airspeed continues to increase (as indicated by the clockwise rotating pointer) and that all three bugs 30 are below the current airspeed. The pilot also knows that V2 bug 30C is exactly 20 kts. below the current indicated airspeed and both V1 bug 30A and VR bug 30B are at least 30 kts. below the current indicated airspeed.

This embodiment of the invention is particularly useful for a houseful for a head-up display during takeoff. This embodiment communicates critical reference or bug speeds to the pilot as he looks out the windshield of the aircraft. There is no need for the pilot to look down at other cockpit instruments to view the bug speeds.

Digital readouts 12 are positioned in the center of ambiguous dial indicators 30. Readouts 12 communicate the absolute value of the airspeed. Readouts 12 are part of the preferred embodiment of the invention which further reduce the ambiguities associated with ambiguous dial indicators.

Figure 4:
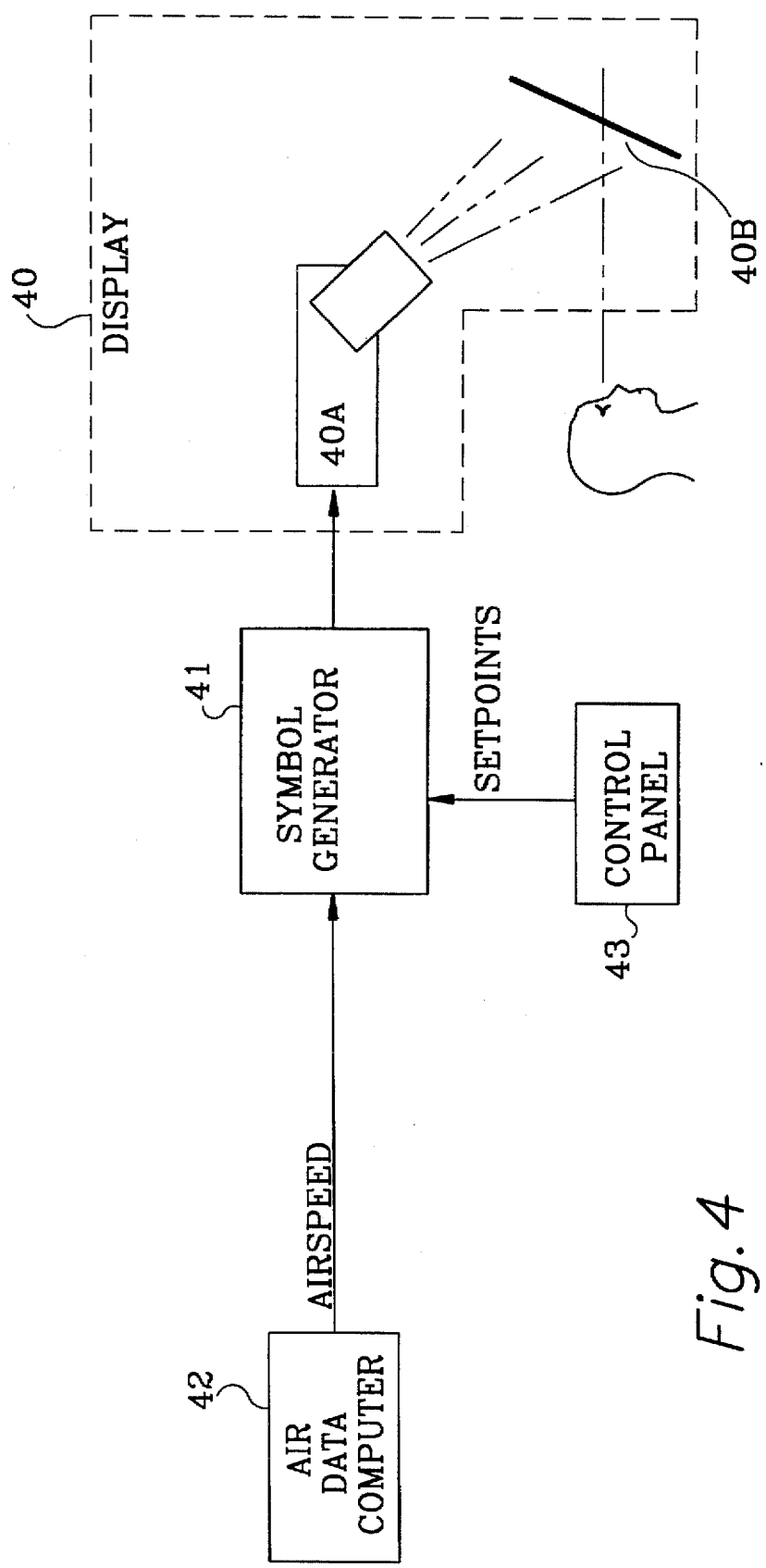
FIG. 4 is a block diagram of the preferred embodiment.

FIG. 4 is a block diagram of the preferred embodiment of the invention. Shown are display 40, symbol generator 41, air data computer 42, and control system 43.

In the preferred embodiment display 40 is a head-up display as shown. Elements of display 40 include overhead unit 40A, and combiner 40B (also generically referred to as display screen 40B). The invention however, is not limited to head-up displays. The invention is adaptable to essentially any display including, but not limited to helmet mounted displays, CRT displays, LCD (i.e. flat panel) displays, and plasma displays.

Symbol generator 41 generates the symbology signals or commands which control what is displayed by display 40. In order to generate the symbology signals, symbol generator 41 communicates with the appropriate sensor (in the preferred embodiment this is the air data computer 42) and with control system 43.

Air data computer 42 functions as a sensor and provides airspeed data to symbol generator 41. Those skilled in the art understand that other sensors may be utilized as appropriate to the specific application.

Control system 43 provides setpoint data to symbol generator 41. In the preferred embodiment, control system 43 includes a performance management system which provides setpoint data to a guidance system which in turn provides the setpoint data to the symbol generator after pilot verification. In alternate embodiments, control system 43 is merely an input device by which the pilot manually inputs each of the desired setpoints.

All of the above listed hardware components are known in the art and will not be described in detail here. The invention consists of a new way to use these previously known hardware components in a new way to provide an improved ambiguous dial indicator.

It is understood that many alternate embodiments are envisioned for the invention. The invention is applicable to any application where it is desired to have bugs used with ambiguous dial indicators.

This description has been for descriptive purposes only and is not intended to limit the scope of the invention. Those skilled in the art recognize numerous alternate embodiments of the invention which deviate from the described embodiment but still perform the same work in substantially the same way to achieve substantially the same result and are therefore equivalent to the invention. Alternate embodiments envisioned include, but are not limited to, using new electronic display devices which may be developed in the future and using the invention with various sensors in addition to airspeed sensors.

It is clear from the foregoing that the present invention represents a new and useful display symbology and apparatus for displaying information on electronic displays and the like.

The embodiments of an invention in which an exclusive property or right is claimed are defined as follows:

1. An ambiguous dial indicator display system for an aircraft comprising:
   a) sensor means for measuring the absolute value of a quantity and generating a quantity signal representative of said absolute value;
   b) a control system means for generating at least one setpoint signal, each of said setpoint signals representative of a setpoint value;
   c) symbol generator means, in communication with said sensor means and said control system means, for generating symbology signals representative of an ambiguous dial indicator having,
      1) an ambiguous closed scale,
      2) a pointer indicative of said absolute value, and,
      3) at least one bug representative of one of said setpoint values, said bug characterized such that when said setpoint value is greater than said absolute value plus an offset then said bug is located at a position on said scale corresponding said absolute value plus said offset, when said setpoint value is less than said absolute value plus said offset and greater than said absolute value minus said offset then said bug is located at a position on said scale corresponding to said setpoint value, and when said setpoint value is less than said absolute value minus said offset then said bug is located at a position on said scale corresponding to said absolute value minus said offset; and,
   d) display means, in communication with said symbol generating means, for displaying said symbology signals to an operator, said display means including,
      1) a display screen portion on which symbols representative of said symbology signals are displayed.

2. The ambiguous dial indicator display system according to claim 1 wherein said display means is a head-up display.

3. The ambiguous dial indicator display system according to claim 2 wherein said display screen portion is a combiner.

4. The ambiguous dial indicator display system according to claim 1 wherein said display means is a flat panel display.

5. The ambiguous dial indicator display system according to claim 1 wherein said display means is a cathode ray tube.

6. The ambiguous dial indicator display system according to claim 1 wherein said sensor means is an airspeed sensor and said at least one bug is representative of selected airspeeds.

7. The ambiguous dial indicator display system according to claim 1 wherein said sensor means is an altitude sensor and said at least one bug is representative of selected altitudes.

8. The ambiguous dial indicator display system according to claim 1 wherein said sensor means is an altitude rate sensor and said at least one bug is representative of selected altitude rates.

9. The ambiguous dial indicator display system according to claim 6 wherein said setpoint values are representative of V-speeds of said aircraft.

10. A display apparatus for displaying a value of a quantity and at least one setpoint, said apparatus comprising:
   a) a signal generator capable of generating symbology signals representative of an ambiguous dial indicator, said ambiguous dial indicator having,
      1) an ambiguous closed scale,
      2) a pointer to said ambiguous scale indicative of said value, and,
      3) at least one bug adjacent to said scale, said bug indicative of said setpoint such that,
         a) when said setpoint is greater than said value plus a first offset said bug is located at a position on said scale corresponding to said value plus said first offset,
         b) when said setpoint is less than said value minus a second offset said bug is located at a position on said scale corresponding to said value minus said second offset, and,
         c) when said setpoint is less than said value plus said first offset and said setpoint is greater than said value minus said second offset then said bug is located at a position on said scale corresponding to said setpoint.

11. The display apparatus according to claim 10 further comprising an electronic display, in communication with said symbol generating means, capable of displaying said symbology signals, said electronic display including,
   1) a display screen portion on which symbols representative of said symbology signals are displayed.

12. The display apparatus according to claim 11 wherein said scale is circular and said pointer extends from the center of said scale.

13. The display apparatus according to claim 11 wherein said quantity is airspeed and said ambiguous scale represents airspeed.

14. The display apparatus according to claim 13 wherein said at least one setpoint are representative of aircraft V-speeds.

15. The display apparatus according to claim 14 wherein said at least one setpoint values include three setpoints representative of an aircraft V1 speed, V2 speed, and VR speed.

16. The display apparatus according to claim 11 wherein said electronic display is a HUD and said display screen portion is a combiner.

* * * * *